United States Patent
Shabel et al.

(10) Patent No.: US 8,493,316 B2
(45) Date of Patent: Jul. 23, 2013

(54) ADJUSTING BACKLIGHT INTENSITY BASED ON A PROGRESS OF A TASK

(75) Inventors: Jeffrey D. Shabel, San Diego, CA (US); Christopher C. Riddle, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 549 days.

(21) Appl. No.: 12/765,480

(22) Filed: Apr. 22, 2010

(65) Prior Publication Data

US 2011/0260958 A1   Oct. 27, 2011

(51) Int. Cl.
*G09G 3/36* (2006.01)

(52) U.S. Cl.
USPC .............................. 345/102; 349/61; 362/561

(58) Field of Classification Search
USPC .................. 345/102; 349/61–70; 362/561
See application file for complete search history.

(56) References Cited

U.S. PATENT DOCUMENTS

| 6,597,339 B1* | 7/2003 | Ogawa .......................... 345/102 |
| 6,725,064 B1 | 4/2004 | Wakamatsu et al. |
| 6,930,671 B2 | 8/2005 | Choi |
| 2002/0036637 A1* | 3/2002 | Ogawa .......................... 345/212 |
| 2007/0167186 A1 | 7/2007 | Boss et al. |
| 2008/0284696 A1 | 11/2008 | Rosenblatt |

FOREIGN PATENT DOCUMENTS

| EP | 1191427 A2 | 3/2002 |
| EP | 1569423 A1 | 8/2005 |
| EP | 2040144 A1 | 3/2009 |

OTHER PUBLICATIONS

International Search Report and Written Opinion—PCT/US2011/033555—ISA EPO-Aug. 12, 2011.
Iranli, Ali et al. "Backlight Dimming in Power-Aware Mobile Displays," Design Automation Conference, Jul. 24-28, 2006. San Francisco, CA, 4 pages.

* cited by examiner

*Primary Examiner* — Kevin M Nguyen
*Assistant Examiner* — Cory Almeida
(74) *Attorney, Agent, or Firm* — Michael Dehaemer; James R. Gambale, Jr.

(57) ABSTRACT

A method of a method of adjusting an intensity of a backlight of a display is disclosed. The method includes dimming a backlight that illuminates a display of an electronic device in response to a task initiated by a user. The method also includes, prior to the task completing, automatically adjusting an intensity of the backlight based on a progress of the task.

32 Claims, 5 Drawing Sheets

ADJUSTING BACKLIGHT INTENSITY BASED ON A PROGRESS OF A TASK

FIELD

The present disclosure is generally related to adjusting backlight intensity.

DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera and a digital video camera. Also, such wireless telephones can process executable instructions, including software applications, such as a web browser application, that can be used to access the Internet. However, power consumption of such portable computing devices can quickly deplete a battery within the device.

In addition, these devices are being used more often (both in frequency and length of time) to browse the web, to read, draft and send e-mail messages, to download/upload/review documents, etc. This activity increases power consumption and further contributes to reduced battery life. To facilitate the use of these functions, display screens of these devices have been getting larger. However, more power is often required to illuminate the screens of devices with larger displays. A backlight of the display can consume a significant amount of power illuminating a display while a user is interacting with the portable computing device. Therefore, it would be beneficial to reduce an amount of power used by a backlight.

SUMMARY

A backlight configured to illuminate a display is dimmed in response to a task initiated by a user, and prior to the task completing, the backlight intensity is adjusted based on a progress of the task. For example, if the user is browsing a website on an electronic device and clicks on a link, the electronic device could immediately lower the backlight intensity to a lower power level. As the page is downloaded and rendered, the backlight intensity can be gradually increased based on a progress of the page download until the complete result is displayed.

In a particular embodiment, a method of adjusting an intensity of a backlight is disclosed. The method includes dimming a backlight that illuminates a display screen of an electronic device in response to a task initiated by a user. The method also includes, prior to the task completing, automatically adjusting an intensity of the backlight based on a progress of the task.

In another particular embodiment, an apparatus is disclosed that includes a processor and a display interface coupled to the processor. The display interface is configured to communicate with a display system including a display and a backlight that illuminates the display. The processor is configured to control the display interface to dim the backlight that illuminates the display in response to a user-initiated task and prior to the user-initiated task completing, automatically adjust an intensity of the backlight based on a progress of the user-initiated task.

One particular advantage provided by at least one of the disclosed embodiments is that power may be saved and battery life may be increased by adjusting the backlight intensity.

Other aspects, advantages, and features of the present disclosure will become apparent after review of the entire application, including the following sections: Brief Description of the Drawings, Detailed Description, and the Claims.

DETAILED DESCRIPTION

Figure 1:
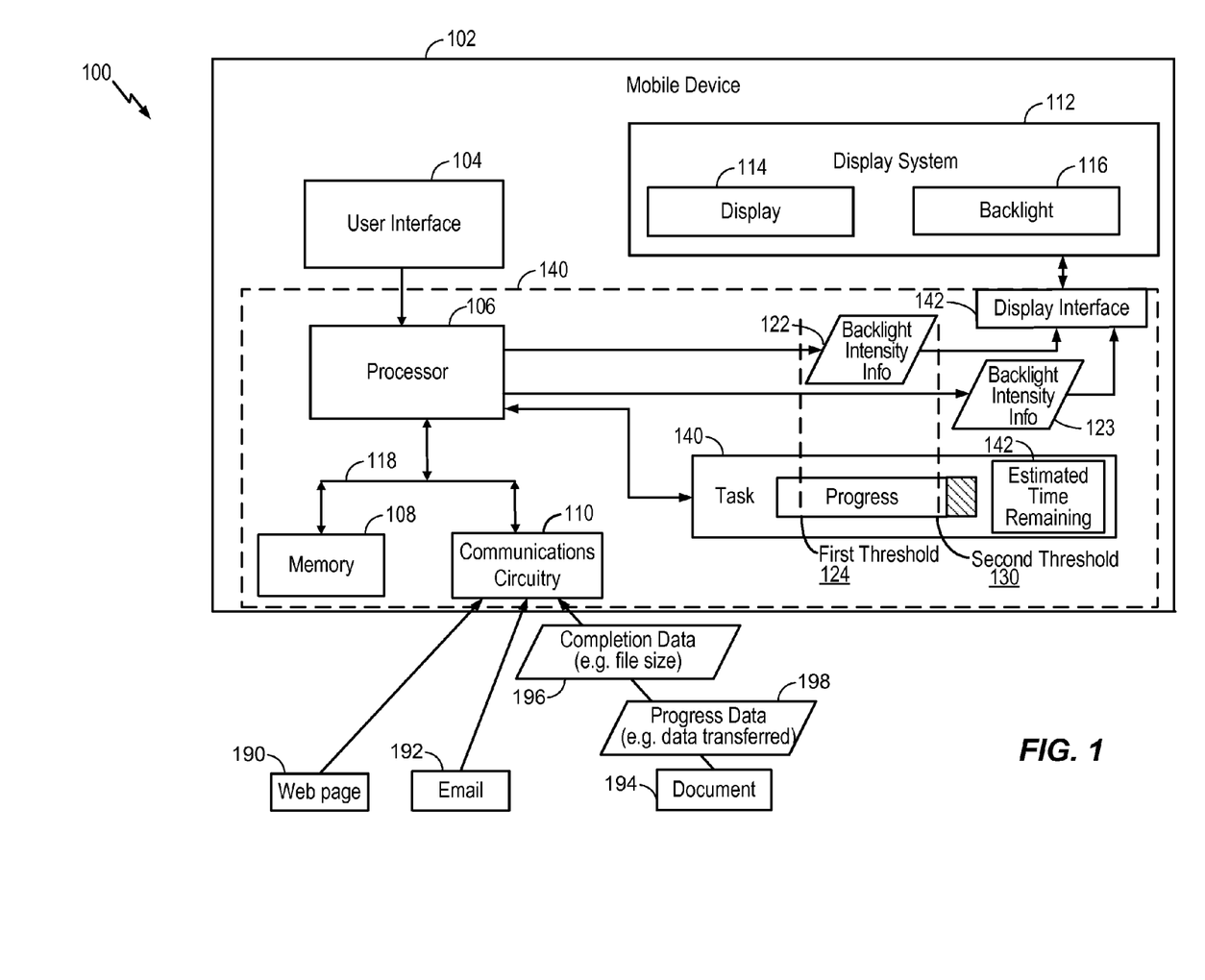
FIG. 1 is a block diagram of a particular illustrative embodiment of a system to adjust a backlight intensity of a display based on a progress of a task.

Referring to FIG. 1, a particular embodiment of a system to adjust a backlight intensity of a display based on a progress of a task is depicted and generally designated 100. The system 100 includes an electronic device 102, a user interface 104, a processor 106, a memory 108, a display system 112, a display interface 142, a bus 118, and communications circuitry 110. The electronic device 102 may include a package or chip 140 that includes the processor 106 and the display interface 142. The processor 106 can control the operation of many functions and other circuitry included in the electronic device 102. The processor 106 may drive the display system 112 via the display interface 142 and may receive user inputs from the user interface 104. The display system 112 includes a display 114 and a backlight 116. In a particular embodiment, the electronic device 102 may be a portable electronic device operable to support media processing and telephone functionality in a single integrated unit.

The memory 108 may include one or more different types of memory that can be used for performing computing functions. For example, the memory 108 may include flash memory, read only memory, programmable read-only memory, erasable programmable read-only memory, and/or random access memory. The memory 108 may store firmware. For example, the memory 108 may store firmware for device applications (e.g., operating system, user interface functions, application programs, and processor functions). The memory 108 may be used to store user data, such as contacts and phone numbers. The application programs, when executed by the processor 106, may provide web browsing functionality, document downloading/uploading, and e-mail services, and may control basic device operations, such as data and voice communication applications. These functions may be facilitated by the display 114. The memory 108 may communicate with the processor 106, the communications circuitry 110, or both via the bus 118.

The user interface 104 may enable a user to interact with the electronic device 102. For example, the user interface 104 can take a variety of forms, such as a button, a keypad, a dial, a click wheel, or a touch screen, as illustrative, non-limiting examples. The user interface 104 is coupled to the processor 106. The processor 106 is coupled to the memory 108 and to the communications circuitry 110 via the bus 118. The user interface 104 enables the user to initiate a task via the user interface 104, such as downloading a document in response to pressing a button at the interface 104, and in response the processor 106 may be configured to dim the backlight 116 of the display 114 to a low level, as described further below.

The communications circuitry 110 may include circuitry for wireless communication (e.g., short-range and/or long-range communication). For example, the communications circuitry 110 may include circuitry that permits wireless communication according to one of the 802.11 standards or a private network. Other wireless network protocol standards, such as Bluetooth, could also be supported by the communications circuitry 110, either as an alternative to the identified protocols or in addition to the identified protocols. The communications circuitry 110 may communicate with the memory 108, the processor 106, or both via the bus 118.

The display system 112 may be configured to present media, including graphics, text, video, or any combination thereof to a user. The display system 112 includes the display 114, which may be a liquid crystal display (LCD), a touch screen display, or any other mechanism to display image, video, or textual data. The display system 112 also includes the backlight 116 to illuminate the display 114. The backlight 116 may include one or more light-emitting diodes (LEDs), light bulbs, or any other light source capable of providing a backlight to the display 114 at a programmable or adjustable intensity level. The display system 112 is coupled to the processor 106 via the display interface 142. In a particular embodiment, the display 114 and the backlight 116 may each be selectively turned on or off by the processor 106.

The processor 106 is coupled to the user interface 104, to the memory 108, to the communications circuitry 110, and to the display system 112. The processor 106 may be configured to execute various processing such as call transmitting and receiving processing, remote network data transfer and processing (e.g. browser-based Internet access), and display illumination and control processing. For example, the processor 106 may monitor a progress of a user-initiated task, such as a representative task 140, by receiving information from the operating system of the electronic device 102 and comparing the progress of the task 140 to a first threshold 124. The processor 106 may control the display interface 142 to automatically adjust an intensity of the backlight 116 based on the progress of the task 140 by providing backlight intensity information 122 to the display system 112 via the display interface 142. The display interface 142 may be responsive to the processor 106 to dim the backlight 116 and to adjust an intensity of the backlight 116. The backlight intensity may be automatically adjusted multiple times prior to detecting completion of the task 140, illustrated as the backlight intensity information 122 and subsequent backlight intensity information 123.

For example, the intensity of the backlight 116 may be adjusted a first amount via the backlight intensity information 122 upon detecting that the progress of the task 140 satisfies a first threshold 124. As an illustrative example, the first threshold 124 may be satisfied when the progress of the task 140 surpasses twenty-five percent completion. The intensity of the backlight 116 may be adjusted a second amount via the subsequent backlight intensity information 123 upon detecting that the progress of the task 140 satisfies a second threshold 130. For example, the second threshold may be satisfied when the progress of the task surpasses forty percent completion. The first threshold 124 and the second threshold 130 may be any values corresponding to a percentage of task completion, and may be determined by the manufacturer of the electronic device 102 and retrieved from the memory 108. Alternatively, or in addition, the first threshold 124 and the second threshold 130 may be user selectable. The first threshold 124 and the second threshold 130 may be provided to the electronic device 102 via a port such as a universal serial bus (USB) port, or by the operating system or an application program, or may be provided wirelessly to the electronic device 102 via the communications circuitry 110. Although the system 100 is depicted as including the first and second thresholds 124, 130, other embodiments may include a single threshold, or more than two thresholds, each of which may trigger a backlight adjustment.

The backlight intensity information 122 and the subsequent backlight intensity information 123 may include one or more intensity or brightness values. For example, the backlight intensity information 122 may include one or more predefined intensity or brightness values of the backlight 116, or a value indicating an adjustable intensity level (e.g. a value from 0-255), as illustrative, non-limiting examples. The backlight intensity information 122 and the subsequent backlight intensity information 123 may be retrieved from the memory 108. In addition, the backlight intensity information 122 and the subsequent backlight intensity information 123 may include intensity or brightness values that cause the backlight 116 to dim when the progress of the task 140 initially surpasses one of the first or second thresholds 124, 130 and thereafter falls below the threshold 124, 130 that was initially surpassed. For example, a browser may make an initial estimate at a progress of a task downloading content (e.g., thirty percent complete, surpassing the first threshold) but as more and more content is loaded, the overall task completion percentage may decrease to twenty percent complete (e.g., more information needs to be downloaded and processed than initially estimated). In that case, the subsequent backlight intensity information 123 may cause the backlight 116 to dim to an intensity level that corresponds to the task progress not having surpassed the first threshold 124.

During operation, the application programs or the operating system may provide progress information regarding a progress of the task 140 initiated by the user, and an intensity of the backlight 116 may be automatically adjusted based on the progress of the task 140. For example, if a user is browsing a website on the electronic device 102 and the user initiates a task by pressing a button or touching the touch screen to access a link via the user interface 104, the processor 106 may be configured to dim the backlight 116 to a low level via backlight intensity information that is provided to the display system 112 in response to the task initiated by the user. As information such as a webpage 190, a document 194, or electronic mail (email) 192 is downloaded and rendered, and prior to the task 140 completing, the intensity of the backlight 116 can be adjusted one or more times until the task 140 is complete and a result of the task 140 is provided at the display 114.

Adjusting the intensity of the backlight 116 may be accomplished by increasing (or decreasing) the intensity of the backlight 116 based on the progress of the task 140 as compared to the first threshold 124 and the second threshold 130, and as the progress of the task 140 compares to the backlight intensity information 122 and subsequent backlight intensity information 123. As explained previously, the first and second thresholds 124, 130 may be set according to various criteria, and the backlight intensity information 122 and the subsequent backlight intensity information 123 may adjust the backlight 116 to one or more predetermined intensity levels. For example, the thresholds, such as the first and second thresholds 124, 130, may be set at intervals of every ten percent completion of the task 140, such that the intensity of the backlight 116 may be correspondingly adjusted by ten percent when a particular threshold has been surpassed, giving the user an indication of the progress of the task based on the brightness of the display 114 or the intensity of the backlight 116.

As another example, the first threshold 124 may be set at fifty percent and the second threshold 130 may be set at eighty percent. When a task 140 is initiated by a user, the backlight 116 may be dimmed to a ten percent intensity level to save power. When the progress of the task 140 surpasses the first threshold 124 (e.g., fifty percent), the intensity of the backlight 116 may be increased to a twenty percent intensity level, and when the progress of the task 140 surpasses the second threshold 130 (e.g., eighty percent), the intensity of the backlight 116 may be increased to almost full intensity (e.g. ninety percent). By keeping the intensity of the backlight 116 at a lower level (e.g., ten percent intensity at initiation of task; twenty percent intensity at fifty percent task completion; ninety percent intensity at eighty percent task completion) for a longer period of time, power consumption by the backlight may be reduced, battery life may be extended, and the user's experience may be enhanced.

In a particular embodiment, the intensity of the backlight 116 may be automatically adjusted based on the progress of the task 140. For example, in a particular embodiment, a progress of the task 140 may be monitored by the processor 106 by receiving information from the operating system of the electronic device 102. To illustrate, when the task 140 includes initiating a data transfer of the representative document 194, such as via the communications circuitry 110, completion data 196 may be received that indicates a criteria for completion of the task 140, such as a total amount of data to be transmitted (e.g. a file size). In addition, progress data 198 (e.g. a total amount of data transmitted or an amount of data remaining to be transmitted) may also be periodically or continuously received or computed to be compared to the completion data 196. A progress of the task 140, the estimated time remaining 142, one or more other task-related metrics, or any combination thereof, may be determined or estimated at least partially based on the progress data 198 and the completion data 196. In response, the intensity of the backlight 116 may be adjusted via the backlight intensity information 122.

The intensity of the backlight 116 may be incrementally increased multiple times prior to completion of the task 140. For example, the intensity of the backlight 116 may be incrementally increased a first amount via the backlight intensity information 122 upon detecting that the progress of the task 140 satisfies a first threshold 124. The intensity of the backlight 116 may be incrementally increased a second amount via the subsequent backlight intensity information 123 upon detecting that the progress of the task 140 satisfies a second threshold 130. In a particular embodiment, the progress of the task 140 may be at least partially based on the estimated time remaining 142 to complete the task 140. The estimated time remaining 142 may be provided to the processor 106 by the operating system of the electronic device 102.

Figure 2:
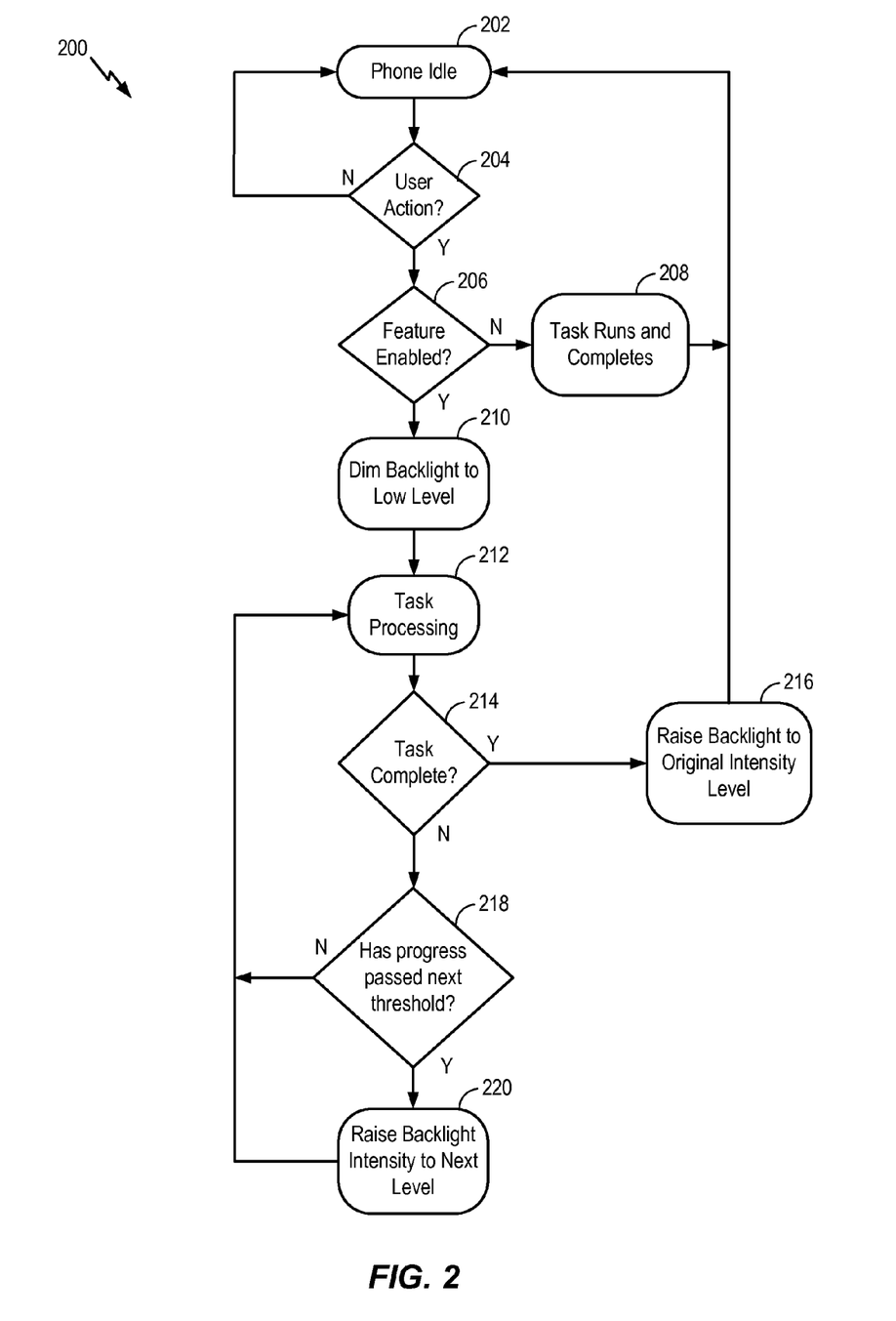
FIG. 2 is a flow diagram of a particular illustrative embodiment of a method of adjusting a backlight intensity of a display based on a progress of a task.

Referring to FIG. 2, a flow diagram of an illustrative embodiment of a method of adjusting a backlight intensity based on a progress of a task is depicted and generally designated 200. The method 200 may be performed by an electronic device having a display backlight, such as the electronic device 102 of the system 100 of FIG. 1. The method starts at 202 with an electronic device, such as a phone, in an idle state. A determination may be made there has been any user action or a task initiated by a user, at 204. For example, a determination may be made whether user input has been received, such as when the user has pushed a button or touched the touch screen via the user interface 104 of FIG. 1 to access a website and to download information from the website. If a user action has been determined, a determination may be made whether a backlight dimming feature has been enabled, at 206. If not, then the task (e.g., downloading information) runs and completes, at 208, and the method returns to the idle state, at 202. If the backlight dimming feature has been enabled, then the backlight may be dimmed to a low level, at 210, and the task continues processing, at 212. For example, the processor 106 of FIG. 1 may provide the backlight intensity information 122 of FIG. 1 to the display system 112 of FIG. 1 to dim the backlight 116 of FIG. 1 to a low level.

A determination may then be made whether the task is complete, at 214. If the task is determined to be complete, the backlight may be raised to an original intensity, at 216, and the processing returns to 202. If the task is not determined to be complete, then a determination may be made whether a progress of the task has passed a next threshold, at 218. For example, the task may have one or more thresholds such as the first threshold 124 and the second threshold 130 of FIG. 1, and the backlight intensity may be adjusted when each threshold is determined to have been reached.

If the progress of the task is determined to not have passed the next threshold, then the processing returns to 212. If the progress of the task is determined to have passed the next threshold, then the backlight intensity may be increased to a next intensity level, at 220, and thereafter the processing returns to 212. In a particular embodiment, the backlight intensity may be increased via backlight intensity information 122 or 123 of FIG. 1.

The backlight intensity may be incrementally increased multiple times prior to detecting completion of the task. For example, the processor 106 of FIG. 1 may monitor a progress of a user-initiated task by receiving information from the operating system of the electronic device 102 of FIG. 1 and comparing the progress of the task 140 to the first threshold 124 of FIG. 1. The processor 106 may automatically adjust an intensity of the backlight 116 of FIG. 1 based on the progress of the task 140 by providing the backlight intensity information 122 of FIG. 1 to the display system 112 of FIG. 1. The intensity of the backlight 116 of FIG. 1 may be incrementally increased a first amount upon detecting that the progress of the task 140 satisfies the first threshold 124 of FIG. 1, and may be incrementally increased a second amount upon detecting that the progress of the task 140 satisfies the second threshold 130 of FIG. 1. In a particular embodiment, the progress of the task 140 may be at least partially based on an estimated amount of time remaining to complete the task 140 that is provided to the processor 106 of FIG. 1 by the operating system of the electronic device 102 of FIG. 1.

As will be recognized by one of skill in the art, the method 200 could be implemented by a computer executing code for performing elements of the method 200. For example, the computer may be could be implemented by a field programmable gate array (FPGA), an application specific integrated circuit (ASIC), a central processing unit (CPU), a digital signal processor (DSP), a controller, another hardware device, a firmware device, or any combination thereof.

Figure 3:
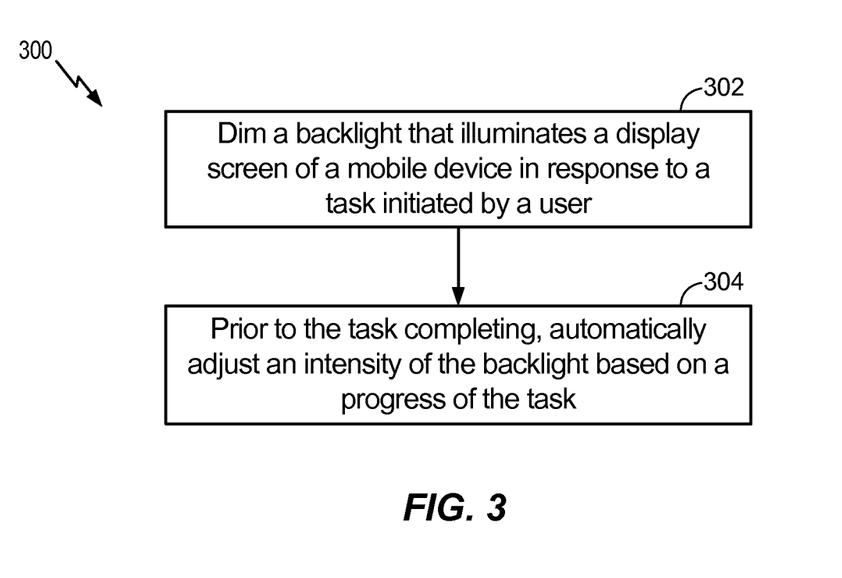
FIG. 3 is a flow diagram of another particular illustrative embodiment of a method of adjusting a backlight intensity of a display based on a progress of a task.

Referring to FIG. 3, a flow diagram of an illustrative embodiment of a method of adjusting an intensity of a backlight of a display based on a progress of a task is depicted and generally designated 300. The method 300 may be performed by a portable electronic device, such as the electronic device 102 of the system 100 of FIG. 1. A backlight that illuminates a display of an electronic device is dimmed in response to a task initiated by a user, at 302. In an illustrative embodiment, the backlight may be backlight 116 of FIG. 1, the display may be the display 114 of FIG. 1, and the task may be the task 140 initiated by the user via the user interface 104 of FIG. 1.

Prior to the task completing, an intensity of the backlight may be automatically adjusted based on a progress of the task, at 304. For example, the progress of the task 140 may be compared to the first threshold 124 of FIG. 1. If the progress of the task 140 has passed the first threshold 124, then the intensity of the backlight 116 may be increased to a next intensity level. The intensity of the backlight may be incrementally increased multiple times prior to detecting completion of the task. For example, the intensity of the backlight 116 of FIG. 1 may be incrementally increased a first amount upon detecting that the progress of the task satisfies the first threshold 124 of FIG. 1, and may be incrementally increased a second amount upon detecting that the progress of the task 140 satisfies the second threshold 130 of FIG. 1.

By dimming the backlight and then automatically adjusting the intensity of the backlight based on a progress of the task, power consumption by the backlight may be reduced with minimal impact to a user experience. As a result, battery life may be extended and the user's experience may be enhanced. As will be recognized by one of skill in the art, the method 300 could be implemented by a computer executing code for performing elements of the method 300. For example, the computer may be a field programmable gate array (FPGA), an application specific integrated circuit (ASIC), a central processing unit (CPU), a digital signal processor (DSP), a controller, another hardware device, a firmware device, or any combination thereof.

Figure 4:
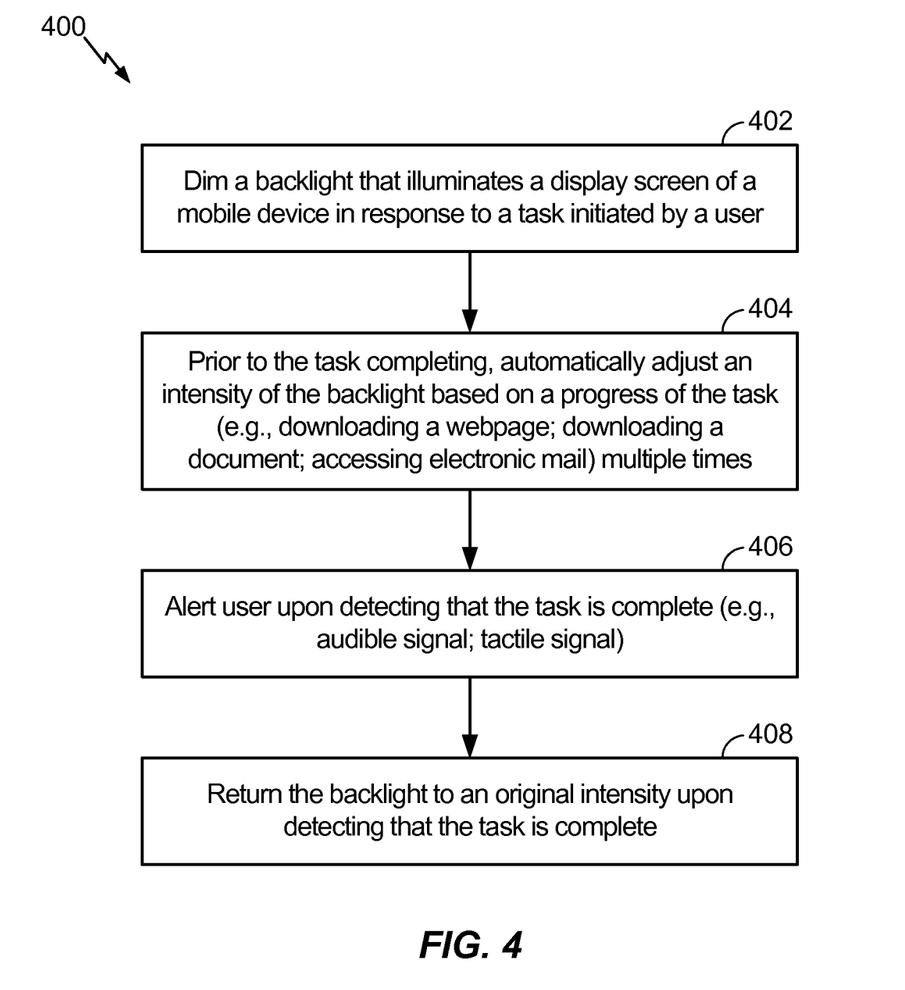
FIG. 4 is a flow diagram of another particular illustrative embodiment of a method of adjusting a backlight intensity of a display based on a progress of a task.

Referring to FIG. 4, a flow diagram of an illustrative embodiment of a method of adjusting an intensity of a backlight of a display based on a progress of a task is depicted and generally designated 400. The method 400 may be performed by a portable electronic device, such as the electronic device 102 of the system 100 of FIG. 1.

A backlight that illuminates a display of an electronic device is dimmed in response to a task initiated by a user, at 402. For example, a user may be browsing a website using the electronic device 102 of FIG. 1 and click on a link via the user interface 104, and the backlight 116 may be dimmed to a low level. Prior to the task completing, an intensity of the backlight may be automatically adjusted based on a progress of the task, at 404. For example, as information such as a webpage, a document, or electronic mail is downloaded and rendered, and prior to the task completing, the intensity of the backlight 116 can be incrementally increased until the complete result is displayed.

Upon detecting that the task is complete, the user may be alerted, at 406. For example, once the webpage, document, or electronic mail is downloaded and rendered, the user may be alerted. In a particular embodiment, the user may be alerted by an audible signal, a tactile signal, or by both an audible signal and a tactile signal. Further, upon detecting that the task is complete, the backlight may be returned to an original intensity, at 408.

By dimming the backlight and then automatically adjusting the intensity of the backlight based on a progress of the task, power consumption by the backlight may be reduced with minimal impact to a user experience. As a result, battery life may be extended and the user's experience may be enhanced. As will be recognized by one of skill in the art, the method 400 could be implemented by a computer executing code for performing elements of the method 400. For example, the computer may be could be implemented by a field programmable gate array (FPGA), an application specific integrated circuit (ASIC), a central processing unit (CPU), a digital signal processor (DSP), a controller, another hardware device, a firmware device, or any combination thereof.

Figure 5:
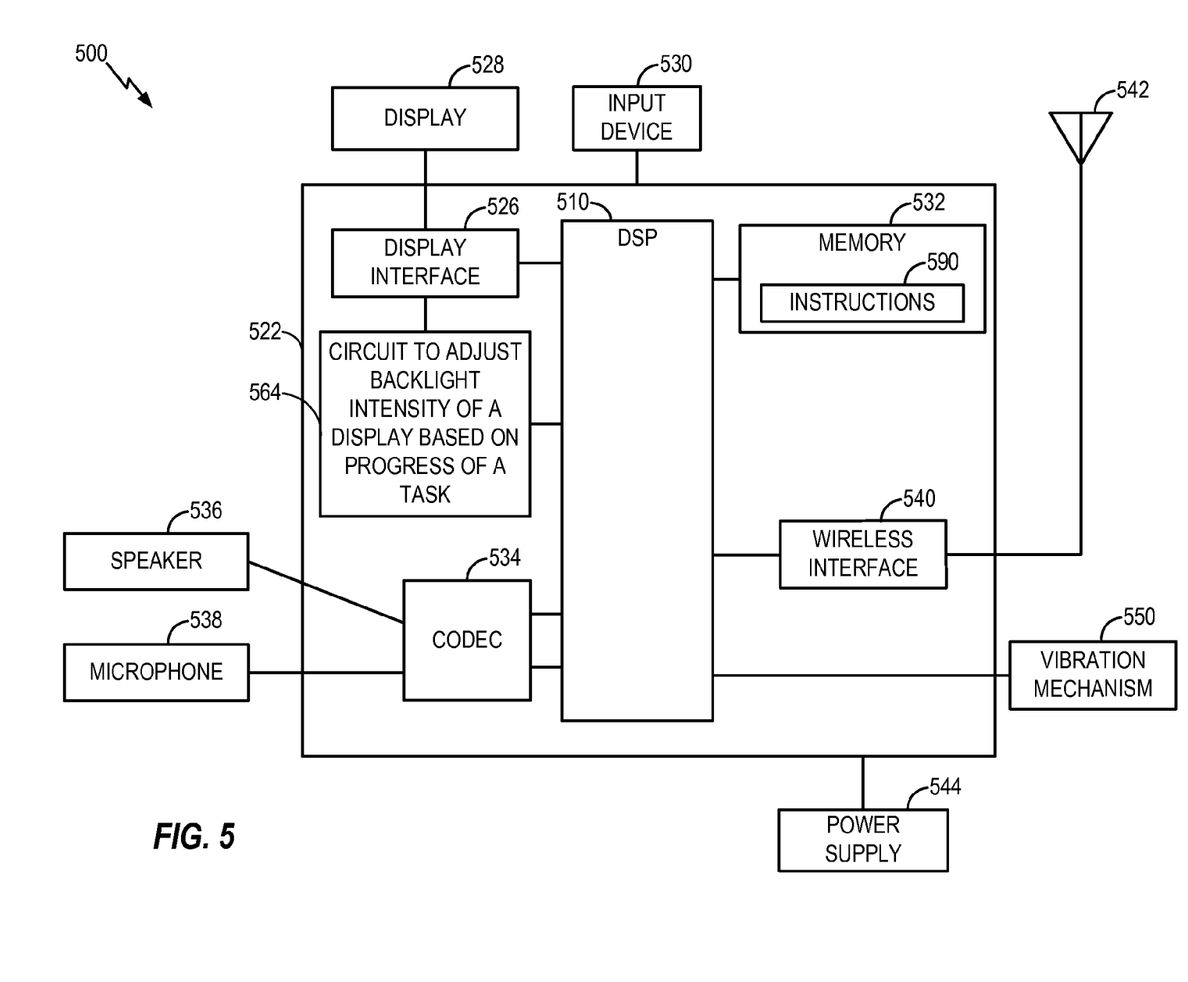
FIG. 5 is a block diagram of a particular illustrative embodiment of a wireless device including a module to adjust a backlight intensity of a display based on a progress of a task.

Referring to FIG. 5, a block diagram of a particular illustrative embodiment of an electronic device, such as a wireless phone, including a circuit to adjust backlight intensity of a display based on progress of a task, as described herein, is depicted and generally designated 500. The device 500 includes a processor, such as a digital signal processor (DSP) 510, coupled to a memory 532 and also coupled to a circuit 564 to adjust backlight intensity of a display 528 based on a progress of a task.

FIG. 5 also shows a display interface 526 that is coupled to the digital signal processor 510 and to the circuit 564 to adjust backlight intensity of the display 528 based on a progress of a task. A coder/decoder (CODEC) 534 can also be coupled to the digital signal processor 510. A speaker 536 and a microphone 538 can be coupled to the CODEC 534. A tactile signal generator, such as a vibrating mechanism 550, may also be coupled to the digital signal processor 510.

FIG. 5 also indicates that a wireless interface 540 can be coupled to the digital signal processor 510 and to a wireless antenna 542. In a particular embodiment, the DSP 510, the display interface 526, the memory 532, the CODEC 534, the wireless interface 540, and the circuit 564 to adjust backlight intensity of a display 528 based on a progress of a task are included in a system-in-package or system-on-chip 522. In a particular embodiment, an input device 530 and a power supply 544 are coupled to the on-chip system 522. Moreover, in a particular embodiment, as illustrated in FIG. 5, the display 528, the input device 530, the speaker 536, the microphone 538, the wireless antenna 542, the vibration mechanism 550, and the power supply 544 are external to the on-chip system 522. However, each can be coupled to a component of the on-chip system 522, such as an interface or a controller.

In a particular embodiment, the DSP 510 executes processor-readable program instructions from a processor-readable medium, such as instructions 590 stored at the memory 532. For example, the memory 532 may be readable by the DSP 510 and the instructions 590 may be operational instructions that are executable by the DSP 510 to perform one or more of the methods of FIGS. 2-4. For example, the instructions 590 may include instructions that are executable by the DSP 510 to dim a backlight that illuminates a display screen of a mobile device in response to a task initiated by a user. For example, the backlight may be a backlight of the display 528. The instructions 590 may further include instructions that are executable by the DSP 510 to, prior to the task completing, automatically adjust an intensity of the backlight based on a progress of the task. The instructions 590 may further include instructions that are executable by the DSP 510 to alert a user upon detecting that the task is complete, such as by an audible signal via the speaker 536 or by a tactile signal such as via the vibration mechanism 550. The instructions 590 may further include instructions that are executable by the DSP 510 to return the backlight to an original intensity upon detecting that the task is complete.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or software executed by a processor depends upon the particular application and design constraints imposed on the overall system. Skilled artisans may implement the described functionality in varying ways for each particular application, but such implementation decisions should not be interpreted as causing a departure from the scope of the present disclosure.

In one or more exemplary embodiments, the functions described may be implemented in hardware, software executed by a processor, firmware, or any combination thereof. The disclosed functions may be directed to a computer readable medium comprising program code that when executed in a device causes the device to perform one or more of the techniques described herein. In that case, the computer readable medium may comprise tangible storage media such as random access memory (RAM), synchronous dynamic random access memory (SDRAM), read-only memory (ROM), non-volatile random access memory (NVRAM), electrically erasable programmable read-only memory (EEPROM), FLASH memory, or the like.

The program code may be stored in memory in the form of computer readable instructions. In that case, a processor, such as a DSP, may execute instructions stored in memory in order to carry out one or more of the image processing techniques. In some cases, the techniques may be executed by a DSP that invokes various hardware components to accelerate the image processing. In other cases, the units described herein may be implemented as a microprocessor, one or more application specific integrated circuits (ASICs), one or more field programmable gate arrays (FPGAs), or some other hardware-software combination.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of tangible storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
   automatically dimming a backlight that illuminates a display of an electronic device in response to a data transfer task initiated by a user for transfer of data for presentation by the display; and
   prior to the data transfer task completing, automatically adjusting an intensity of the backlight based on a progress of the data transfer task.

2. The method of claim 1, wherein the data transfer task includes downloading a webpage.

3. The method of claim 1, wherein the data transfer task includes downloading a document.

4. The method of claim 1, wherein the data transfer task includes accessing electronic mail.

5. The method of claim 1, further comprising alerting a user upon detecting that the data transfer task is complete.

6. The method of claim 5, wherein the user is alerted by an audible signal.

7. The method of claim 5, wherein the user is alerted by a tactile signal.

8. The method of claim 1, wherein automatically adjusting the intensity of the backlight comprises adjusting the intensity of the backlight multiple times prior to detecting completion of the data transfer task.

9. The method of claim 8, wherein automatically adjusting the intensity of the backlight comprises determining when the progress of the data transfer task satisfies a first threshold and adjusting the backlight intensity a first amount upon detecting that the progress of the data transfer task satisfies the first threshold and determining when the progress of the data transfer task satisfies a second threshold and adjusting the backlight intensity a second amount upon detecting that the progress of the data transfer task satisfies the second threshold.

10. The method of claim 1, wherein the progress of the data transfer task is estimated at least partially based on an estimated amount of time remaining to complete the data transfer task.

11. The method of claim 1, further comprising returning the backlight to an original intensity upon detecting that the data transfer task is complete.

12. The method of claim 1, wherein automatically adjusting the intensity of the backlight comprises increasing the intensity of the backlight.

13. The method of claim 1, wherein automatically adjusting the intensity of the backlight comprises decreasing the intensity of the backlight.

14. The method of claim 1, wherein the data transfer task is completed when the transfer of data for presentation by the display is complete.

15. An apparatus comprising:
   a processor; and
   a display interface coupled to the processor and configured to communicate with a display system including a display and a backlight that illuminates the display,
   wherein the processor is configured to control the display interface to dim the backlight that illuminates the display in response to a user-initiated data transfer task for transfer of data for presentation by the display and prior to the user-initiated data transfer task completing, automatically adjust an intensity of the backlight based on a progress of the user-initiated data transfer task.

16. The apparatus of claim 15, further comprising the display system coupled to the display interface within an electronic device.

17. The apparatus of claim 16, wherein the electronic device comprises a wireless communication device.

18. The apparatus of claim 15, wherein automatically adjusting the intensity of the backlight comprises adjusting the intensity of the backlight multiple times prior to detecting completion of the user-initiated data transfer task.

19. The apparatus of claim 18, wherein automatically adjusting the intensity of the backlight comprises determining when the progress of the user-initiated data transfer task satisfies a first threshold and adjusting the backlight intensity a first amount upon detecting that the progress of the user-initiated data transfer task satisfies the first threshold and determining when the progress of the user-initiated data transfer task satisfies a second threshold and adjusting the backlight intensity a second amount upon detecting that the progress of the user-initiated data transfer task satisfies the second threshold.

20. The apparatus of claim 15, wherein the progress of the user-initiated data transfer task is estimated at least partially based on an estimated amount of time remaining to complete the user-initiated data transfer task.

21. The apparatus of claim 15, wherein the processor is configured to return the backlight to an original intensity upon detecting that the user-initiated data transfer task is complete.

22. The apparatus of claim 15, wherein the data transfer task is completed when the transfer of data for presentation by the display is complete.

23. A non-transitory computer-readable medium storing computer executable code comprising:
  code for dimming a backlight that illuminates a display screen of an
  electronic device in response to a data transfer task initiated by a user for transfer of data for presentation by the display; and
  code for automatically adjusting an intensity of the backlight, prior to the
  data transfer task completing, based on a progress of the data transfer task.

24. The computer readable medium of claim 23, further comprising code for automatically adjusting the intensity of the backlight by adjusting the intensity of the backlight multiple times prior to detecting completion of the data transfer task.

25. The computer readable medium of claim 24, further comprising code for determining when the progress of the data transfer task satisfies a first threshold and adjusting the backlight intensity a first amount upon detecting that the progress of the data transfer task satisfies the first threshold and determining when the progress of the data transfer task satisfies a second threshold and adjusting the backlight intensity a second amount upon detecting that the progress of the data transfer task satisfies the second threshold.

26. The computer readable medium of claim 23, further comprising code for returning the backlight to an original intensity upon detecting that the task is data transfer complete.

27. The computer readable medium of claim 23, wherein the data transfer task is completed when the transfer of data for presentation by the display is complete.

28. An apparatus comprising:
  means for dimming a backlight that illuminates a display screen of an electronic device in response to a data transfer task initiated by a user for transfer of data for presentation by the display; and
  means for automatically adjusting an intensity of the backlight prior to the data transfer task completing based on a progress of the data transfer task.

29. The apparatus of claim 28, wherein the means for automatically adjusting further comprises means for adjusting the intensity of the backlight multiple times prior to detecting completion of the data transfer task.

30. The apparatus of claim 29, further comprising means for determining when the progress of the data transfer task satisfies a first threshold and adjusting the backlight intensity a first amount upon detecting that the progress of the data transfer task satisfies the first threshold and for determining when the progress of the data transfer task satisfies a second threshold and adjusting the backlight intensity a second amount upon detecting that the progress of the data transfer task satisfies the second threshold.

31. The apparatus of claim 28, further comprising means for returning the backlight to an original intensity upon detecting that the data transfer task is complete.

32. The apparatus of claim 28, wherein the data transfer task is completed when the transfer of data for presentation by display is complete.

* * * * *